Patented Mar. 2, 1937

2,072,260

UNITED STATES PATENT OFFICE 2,072,260

CHEMICAL STABILIZATION OF CELLULOSE ESTERS

Clifford I. Haney, Drummondville, Quebec, Canada, assignor to Celanese Corporation of America, a corporation of Delaware No Drawing. Application September 29, 1934, Serial No. 746,262

15 Claims. (Cl. 260—102)

This invention relates to the process of preparing organic esters of cellulose and relates more particularly to the stabilization or removal, by means of chemicals of labile sulphur compounds and other unstable compounds from organic esters of cellulose after the same have been ripened and precipitated or otherwise removed or separated from the ripening solution. The treatment of the organic esters of cellulose by chemicals renders the organic ester of cellulose more stable for forming into solutions for the production of films, filaments, lacquers, plastic masses, etc.

An object of the invention is the economic and expeditious preparation of a stable organic ester of cellulose that is colorless in solution, that does not darken upon standing in solution, that has an exceptionally high heat test and that has many other improved textile properties. Other objects of the invention will appear from the following detailed description.

In the process of preparing organic esters of cellulose, the esterification of the cellulose is usually carried out by treating the cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon usually after the addition of a certain quantity of water, the cellulose ester is permitted to hydrolyze or ripen to develop the desired solubility characteristics. Water and/or other non-solvent for the cellulose ester may then be added in sufficient amounts to precipitate the cellulose ester from solution. The cellulose ester is then washed and/or distilled to free it of acids as much as possible.

Thus in preparing cellulose acetate, cellulose is acetylated by treatment with acetic anhydride and a catalyst, such as sulphuric acid, in the presence of glacial acetic acid as a solvent for the cellulose acetate that is formed. After completion of the acetylation, the resulting solution of cellulose acetate in glacial acetic acid is ripened and then treated with a large excess of water or other non-solvent to precipitate the cellulose acetate. After precipitation the cellulose acetate may be washed with water to remove as much acid and other non-cellulose ester ingredients of the acetylation mixture as possible.

The cellulose ester so formed contains sulphur in the form of various compounds which impair the stability of the cellulose ester and impart thereto the tendency of decomposing, degrading and/or discoloring. There may also be formed cellulose derivatives that tend to decompose and break down in the presence of the sulphur compounds.

By employing this invention the precipitated cellulose esters are treated with chemicals to remove the sulphur compounds and the unstable compounds or to convert the same into non-decomposing or non-deteriorating compounds. This chemical treatment may be performed by adding suitable chemicals to the wash water or the cellulose esters may be washed and then treated with a solution containing the chemicals. The precipitated ester may be redissolved and treated in the redissolved state with chemicals or they may be treated while reprecipitating the esters from such a solution.

By the method of this invention the cellulose esters are made more stable, have a higher heat test and are given enhanced spinning properties. Thus the cellulose esters prepared according to this invention show an enormous improvement ing spinning stability and ability to be spun into filaments of low denier. These cellulose esters have excellent filtration properties, their solutions passing readily through the filtering media.

Cellulose esters prepared according to this invention have a high heat test, that is, they may be heated to a relatively high temperature without decomposing or charring. They are stable in the presence of light and acids. The yarn and fabric made from filaments formed from cellulose esters prepared according to this invention are dyed evenly and to the same extent, by water insoluble dyes, as the same type of materials prepared by other methods of stabilizing. A solution of the cellulose ester in a solvent is much clearer than cellulose esters treated according to non-chemical means. In some cases the viscosity of the cellulose ester is slightly reduced and it is found that the more reagent used, the lower the viscosity. By reducing the quantity of chemical reagent used and prolonging the time of treatment or more thorough mixing of the reagent with the cellulose ester there is produced a cellulose ester substantially free of sulphur compounds, one that has a high heat test and stability with only a very slight amount of lowering of the viscosity.

According to this invention cellulose esters are stabilized in the precipitated form or after they have been precipitated and redissolved by means of various chemicals. This consists in precipitating metallic salts of weak acids or salts of basic character in the cellulose esters. These salts should preferably be as insoluble in water as possible so that they do not wash out of the yarn at a later date. The precipitate should also be of such a fine nature that it does not interfere with the filtration or spinning process.

This invention may be employed in the making of any suitable organic ester of cellulose such as cellulose acetate, cellulose formate, cellulose propionate and cellulose butyrate. Cellulose in any suitable form, such as cotton, cotton linters, wood pulp either sulphite or soda pulp, reconstituted cellulose etc., may be employed in making the cellulose esters. This cellulose may be activated by pretreatment with lower aliphatic acids or by treatment with alkali, etc. The esterifying agent may be acetic anhydride, formic acid, propionic anhydride or butyric anhydride, depending upon the ester of cellulose to be formed.

The esterification may be carried out in the presence of a suitable catalyst such as sulphuric acid, sodium bisulphate, methyl sulphate or a mixture of these with each other or with other catalysts, such as zinc chloride. While we prefer to employ acetic acid as the diluent or solvent for the cellulose esters to be formed, any other suitable organic acid may be employed such as propionic acid and butyric acid. The sulphur bearing acids and salts employed as catalyst are rearranged or broken down in the esterifying process and some of the sulphur present combines with the reagents present to form sulphoacetates of cellulose. The sulpho-acetates of cellulose are difficult to remove and greatly decrease the stability of the final product obtained. Sulpho-cellulose compounds are also formed from sulphur compounds included in the anhydride and diluent used, which anhydride and diluent may have been used in the pretreating or esterification of previous batches of cellulose using sulphuric acids or sulphate salts as catalysts. The sulphur compounds are present in the anhydride or diluent due to the fact that the anhydride or diluent was converted or concentrated in the presence of sulphuric acid or sulphate salts as catalysts, or for the reason that the sulphuric acid or sulphate salts may have been present as impurities in the catalysts employed.

The cellulose ester may be hydrolyzed or ripened by the addition of a suitable quantity of water to the primary solution resulting from the esterifying process and permitting the same to stand at suitable temperature for such time until the cellulose ester develops the desired solubility characteristics, prior to distillation or precipitation and draining and/or distillation to recover a part or all of the organic acid employed as a solvent or diluent in the esterification process. During the hydrolyzing or ripening period small quantities of inorganic salts may be added to the solution as an aid in reducing the formation of unstable compounds. Examples of such salts are sodium chloride, aluminum chloride and zinc chloride. In certain cases hydrochloric acid may be employed as an aid in reducing the formation of unstable compounds. The addition of such materials may permit of the reduction of the amount of catalyst used in the esterification mixture or in the ripening solution.

The catalyst used in the esterification and ripening solutions or mixtures may be wholly or partially neutralized prior to the precipitation of the cellulose ester from the ripening solution. Thus where a catalyst, such as sulphuric acid, that has a strong degrading action on the cellulose ester compounds is employed in the esterifying process, it may be neutralized by the addition of an alkali or alkaline salt, such as the carbonate or bicarbonate of sodium or potassium or the ammonium salt of the organic acid employed as diluent or solvent.

Prior to precipitation the cellulose esters may be treated with basic salts such as basic aluminum acetate, sodium aluminate, sodium acetate or with mixtures of these with aluminum chloride, zinc chloride or hydrochloric acid. This treatment acts to stabilize the cellulose esters by removing sulphur labile compounds and other non-stable compounds.

As stated above and according to this invention the cellulose esters, after they have been precipitated or otherwise removed from the primary solutions or mixtures of reagents wherein they are formed, either before or after ripening, are dissolved or suspended in a suitable solvent or suspension liquid and treated by adding to the resulting bath thus formed a soluble salt of a metal that forms an insoluble or slightly soluble basic salt, such as a basic acetate, basic chloride, or basic sulphate. This chemical treatment forms stable compounds of the unstable compounds and especially those containing sulphur that are included in the cellulose ester material.

The ester of cellulose precipitated, either before or after ripening, and either with or without first subjecting the precipitated ester to such stabilizing treatments as have heretofore been employed, may then be dissolved in a suitable solvent such as organic acids like acetic acid, formic acid, propionic acid, etc., or any other suitable solvent or they may be suspended in an aqueous solution of such organic acids. To the solution or suspension thus formed is added the soluble salt of a metal that readily forms a basic salt, either in powdered form or dissolved in a suitable solvent. Examples of such salts are the acetates of sodium or potassium, zinc chloride, aluminum chloride and the like or mixtures of these salts. It is found that excessive amounts of these salts lower the viscosity of the cellulose esters, however, without degrading the cellulose esters, thus cellulose esters of normal acid value that are of low viscosity may be made for lacquer and like purposes by employing an excess of the stabilizing reagent.

After addition of the salt to the solution or suspension, heat may be applied thereto. Any degree of temperature may be employed from below room temperature to above the boiling point of the organic acid used as solvent or suspension liquid. The stabilizing action may be carried out in any desired pressure from a vacuum to superatmospheric pressure. It is preferable to use atmospheric pressure and a temperature around the boiling point of the liquid used.

For the purpose of describing the invention and not with the intention of being limited thereto there is given the following examples.

*Example I*

Basic aluminum acetate is precipitated in cellulose acetate by bringing to the boil a bath containing precipitated cellulose acetate in dilute aqueous solutions of aluminum acetate. Cellulose acetate stabilized by precipitating therein a basic aluminum acetate is colorless in solution and is stable to light and heat.

Basic aluminum acetate is also precipitated by soaking cellulose acetate in dilute solutions of aluminum chloride, then adding sodium acetate and boiling, preferably followed by washing. Precipitation may also be brought about by the addition of small amounts of a base. Thus using aluminum chloride solutions, one can precipitate a stability promoting salt at ordinary temperatures using a base such as a carbonate of an alkali. Aluminum sulphate behaves in a similar fashion.

Chlorides of other metals that tend to hydrolyze and form basic salts in water are useful, for instance, those of tin and lead. Zinc chloride or a mixture of zinc chloride and aluminum chloride may be precipitated by either heat or at normal temperatures with a base such as an alkali or a basic salt such as sodium acetate. The cellulose acetate stabilized in this manner is colorless in solution and stable to light and heat.

Example II 12 parts of precipitated unstabilized cellulose acetate are placed in water containing 0.4 parts of $AlCl_3 6H_2O$. After 20 minutes 0.7 parts of sodium acetate are added and the temperature raised to the boiling point and kept there one half hour after which the cellulose acetate is washed several times. It is found that the cellulose acetate has a high degree of stability and the heat test has been raised from 186° to 234°.

Example III 120 grams of a partially stabilized cellulose acetate is dissolved in 600 grams of glacial acetic acid (or formic acid) at 99° C. and to this solution is added 40 cc. of $ZnCl_2$ dissolved in acetic acid. The solution is maintained at 99° C. for one-half hour. The cellulose acetate is then precipitated from solution with water. The cellulose acetate does not precipitate in fibre form but into small lumps, which are easily broken into a powder. The clarity is raised and a good stability obtained. There is a slight reduction in the viscosity.

Example IV 120 parts of unstabilized cellulose acetate is dissolved in 600 parts glacial acetic acid at 99° C. To this solution is added 5% zinc chloride and 5% sodium acetate (on the basis of the weight of cellulose acetate). The solution is cooled and precipitated in a soft fibre form with water and washed neutral. It is found that there is produced a very stable cellulose acetate having a high melting point and a high heat test. There is also produced a low sulphate content. The viscosity of the cellulose acetate is not appreciably reduced.

In any of the above examples the cellulose acetate may be suspended in aqueous solutions of the acid instead of being dissolved in the concentrated acid with substantially the same results.

It is to be understood that the foregoing detailed description is given merely by way of illustration and many variations may be made therein without departing from the spirit of my invention.

Having described my invention, what I desire to secure by Letters Patent is:

1. Process for stabilizing organic acid esters of cellulose which have been prepared by esterification in the presence of a sulphur-containing catalyst, which comprises intimately mixing the ester with a liquid medium comprising a substantial proportion of a solvent for the cellulose ester, and precipitating in the medium a water-insoluble salt of basic character.

2. Process for stabilizing cellulose acetate which has been prepared by acetylation in the presence of a sulphur-containing catalyst, which comprises intimately mixing the cellulose acetate with a liquid medium comprising a substantial proportion of a solvent for the cellulose acetate, and precipitating in the medium a water-insoluble salt of basic character.

3. Process for stabilizing cellulose acetate which has been prepared by acetylation in the presence of a sulphur-containing catalyst, which comprises intimately mixing the cellulose acetate with a liquid medium comprising a substantial proportion of a solvent for the cellulose acetate, and precipitating in the medium a finely divided water-insoluble salt of basic character.

4. Process for stabilizing cellulose acetate which has been prepared by acetylation in the presence of a sulphur-containing catalyst, which comprises dissolving the cellulose acetate in acetic acid, and precipitating in the solution a water-insoluble salt of basic character.

5. Process for stabilizing cellulose acetate which has been prepared by acetylation in the presence of a sulphur-containing catalyst, which comprises forming a suspension of the cellulose acetate in aqueous acetic acid, and precipitating in the suspension a water-insoluble salt of basic character.

6. In a process for the manufacture of organic acid esters of cellulose, the steps of esterifying cellulose in the presence of a sulphur-containing catalyst, separating the ester from the solution in which it is formed, intimately mixing it with a liquid medium comprising a substantial proportion of a solvent for the cellulose ester, introducing into the liquid medium a soluble salt of a metal capable of forming a water-insoluble basic salt, and treating the compositions so formed to produce said basic salt.

7. In a process for the manufacture of organic acid esters of cellulose, the steps of esterifying cellulose in the presence of a sulphur-containing catalyst, separating the ester from the solution in which it is formed, dissolving the separated ester in an organic acid, introducing into the solution a salt, soluble therein, of a metal capable of forming a water-insoluble basic salt, and treating the solution to produce said basic salt.

8. In a process for the manufacture of organic acid esters of cellulose, the steps of esterifying cellulose in the presence of a sulphur-containing catalyst, separating the ester from the solution in which it is formed, forming a suspension of the ester in an aqueous solution of an organic acid, introducing into the suspension a salt, soluble in the aqueous acid, of a metal capable of forming a water-insoluble basic salt, and treating the composition so formed to produce said basic salt.

9. In a process for the manufacture of cellulose acetate, the steps of acetylating cellulose in the presence of a sulphur-containing catalyst, separating the cellulose acetate from the solution in which it is formed, dissolving the separated cellulose acetate in acetic acid, introducing into the solution a salt, soluble therein, of a metal capable of forming a water-insoluble basic salt, and treating the solution to produce said basic salt.

10. In a process for the manufacture of cellulose acetate, the steps of acetylating cellulose in the presence of a sulphur-containing catalyst, separating the cellulose acetate from the solution in which it is formed, forming a suspension of the cellulose acetate in aqueous acetic acid, introducing into the suspension a salt, soluble in the aqueous acid, of a metal capable of forming a water-insoluble basic salt, and treating the composition so formed to produce said basic salt.

11. In a process for the manufacture of organic acid esters of cellulose, the steps of esterifying cellulose in the presence of a sulphur-containing catalyst, separating the ester from the solution in which it is formed, intimately mixing it with a liquid medium comprising a substantial proportion of a solvent for the cellulose ester, adding to the liquid medium containing the ester, a salt soluble in the liquid medium, of a metal capable of forming a water-insoluble basic salt containing the same acid radicle as the added salt, and adding a basic compound capable of reacting with said salt to form said basic salt.

12. In a process for the manufacture of cellulose acetate, the steps of acetylating cellulose in the presence of a sulphur-containing catalyst, separating the cellulose acetate from the solution in which it is formed, intimately mixing it with a liquid medium comprising a substantial proportion of acetic acid, forming in the liquid medium an acetate of a metal selected from the group which consists of aluminum, zinc, tin and lead, and heating the composition so formed until a basic acetate of the metal is produced.

13. In a process for the manufacture of cellulose acetate, the steps of acetylating cellulose in the presence of a sulphur-containing catalyst, separating the cellulose acetate from the solution in which it is formed, intimately mixing it with a liquid medium comprising a substantial proportion of acetic acid, adding to the liquid medium an acetate of a metal selected from the group which consists of aluminum, zinc, tin and lead, and heating the composition so formed until a basic acetate of the metal is produced.

14. In a process for the manufacture of cellulose acetate, the steps of acetylating cellulose in the presence of a sulphur-containing catalyst, separating the cellulose acetate from the solution in which it is formed, intimately mixing it with a liquid medium comprising a substantial proportion of acetic acid, forming in the liquid medium an acetate of a metal selected from the group which consists of aluminum, zinc, tin and lead, and adding a soluble basic compound to precipitate a basic acetate of the metal.

15. In a process for the manufacture of cellulose acetate, the steps of acetylating cellulose in the presence of a sulphur-containing catalyst, separating the cellulose acetate from the solution in which it is formed, intimately mixing it with a liquid medium comprising a substantial proportion of acetic acid, adding to the liquid medium an acetate of a metal selected from the group which consists of aluminum, zinc, tin and lead, and adding a soluble basic compound to precipitate a basic acetate of the metal.

CLIFFORD I. HANEY.